Figure 1:
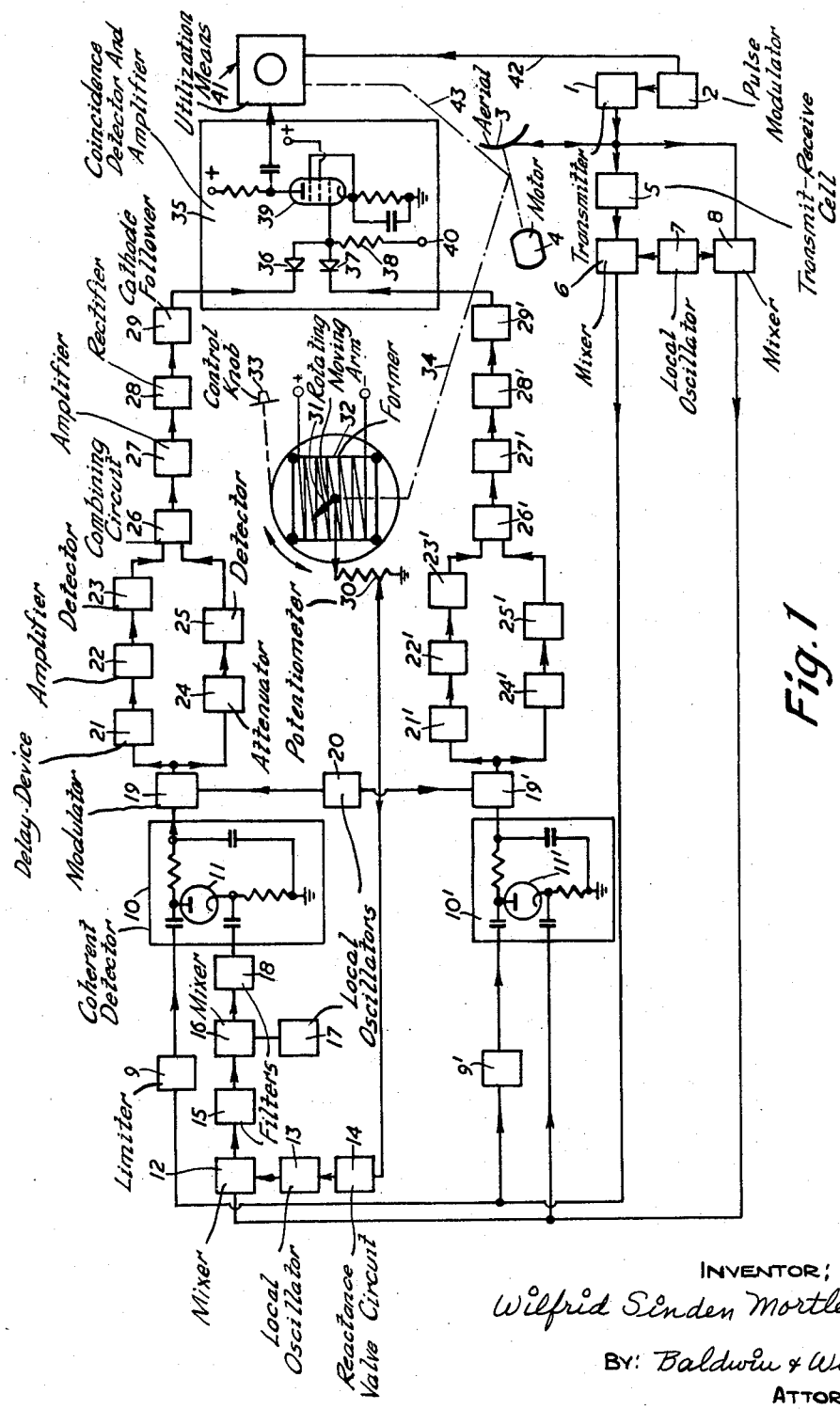

April 14, 1964

W. S. MORTLEY 3,129,423

TARGET CANCELLING RADAR SYSTEMS

Filed Oct. 5, 1956

2 Sheets-Sheet 1

INVENTOR:
Wilfrid Sinden Mortley
BY: Baldwin & Wight
ATTORNEYS

United States Patent Office 3,129,423
Patented Apr. 14, 1964

3,129,423
TARGET CANCELLING RADAR SYSTEMS
Wilfrid Sinden Mortley, Essex, England, assignor to The Marconi Company Limited, London, England, a British company
Filed Oct. 5, 1956, Ser. No. 614,317
Claims priority, application Great Britain Oct. 21, 1955
7 Claims. (Cl. 343—7.7)

This invention relates to target cancelling radar systems and more specifically to so called moving target indicator (M.T.I.) radar systems, i.e. to radar systems which are so controlled and arranged as to be capable of eliminating from the targets displayed, targets having pre-determined velocities relative to the radar system. A common requirement is that of eliminating fixed targets from the display, but, as is well known, M.T.I. radar systems are not limited to those in which only fixed targets are eliminated.

The principal object of this invention is to provide improved M.T.I. radar systems in which targets of substantially different velocities in relation to the system may be eliminated so long as the said targets are not in the same or closely adjacent positions. Known M.T.I. radar systems as at present in general use are not capable of achieving this result which is often highly desirable in airborne radars and also in ground radars employed for such purposes as airfield approach and blind landing. Thus, for example, it would be of great advantage in a radar system at an airfield to be able to eliminate from the display both fixed targets at one range and moving rain patches or belts at another range, for heavy rain in the neighbourhood of an airfield may render existing radar systems temporarily almost useless from the point of view of practical safety.

There are many known M.T.I. radar systems which eliminate fixed targets by making use of one or other of the well known circuits for pulse cancellation. In general in such radars the intermediate frequency (I.F.) signals resulting from reception and frequency changing are fed to a coherent detector (a detector which is sensitive to phase) to which a reference frequency is also fed and the output from this detector is divided into two paths one of which contains a delay circuit or device providing a delay equal to the pulse interval in the transmitted pulses and the other of which provides no delay, the outputs from the two paths (the delayed and the undelayed) being combined in opposition. Although the outputs from the two paths are combined in opposition, the required echo signal will not be in phase opposition and is therefore not cancelled out. Accordingly the resultant from combination includes substantially no signals due to fixed targets since these will cancel one another out in the outputs from the two paths, but it will contain signals due to targets which have moved an appreciable fraction of a wavelength between one transmitted pulse and the next. While this method of pulse cancellation can be adapted to eliminate echoes due to moving targets by changing the reference frequency fed to the coherent detector by mixing with said frequency a component of frequency chosen to correspond with the velocity of the targets whose echoes are to be eliminated, it will be obvious that if this is done elimination of fixed target echoes will no longer be obtained since elimination of echoes from targets of any particular velocity requires a particular value of frequency component the said value being zero in the case of a fixed target. If, therefore, the added frequency component is chosen to be correct to eliminate echoes from targets of one velocity it will be incorrect for the elimination of echoes from targets of a different velocity, for example zero. The present invention seeks to overcome this difficulty, and is capable of achieving this result so long as the targets of different velocities are not in the same or closely adjacent positions. The benefit thus obtained, though obviously not so good as would be obtained were it possible to eliminate targets of different velocities irrespective of position, is still substantial as compared to at present known practice.

According to this invention the receiver portion of a radar system includes at least two signal channels with their inputs in parallel, means in one of said channels for substantially cancelling signals due to targets having one pre-determined velocity with reference to the system, means in another of said channels for substantially cancelling signals due to targets having another pre-determined velocity with reference to said systems, detector means fed with the outputs from said channels, said detector means being adapted to provide zero output when any of the inputs thereto is zero, and means for utilizing the output from said detector means.

The detector means is preferably constituted by a coincidence detector though other arrangements, e.g. a product detector may be used.

In a preferred practical embodiment one of the channels is provided with means for substantially cancelling signals due to targets having zero velocity with reference to the system and at least one other channel is provided with means for cancelling signals and, preceding said means in said other channel, means for mixing with the signals fed to said other channel a pre-determined frequency component the value of which is chosen in dependence upon the target velocity with respect to which the signal cancelling means is to be operative.

A preferred circuit arrangement includes means for applying the signals to modulate a carrier, means for feeding the modulated carrier into two paths one of which contains a detector preceded by a delay device providing a delay time equal to the interval of time between successive transmitted pulses, and the other of which contains a detector without a preceding delay device and means for combining the detected resultants in opposition.

Figure 2:
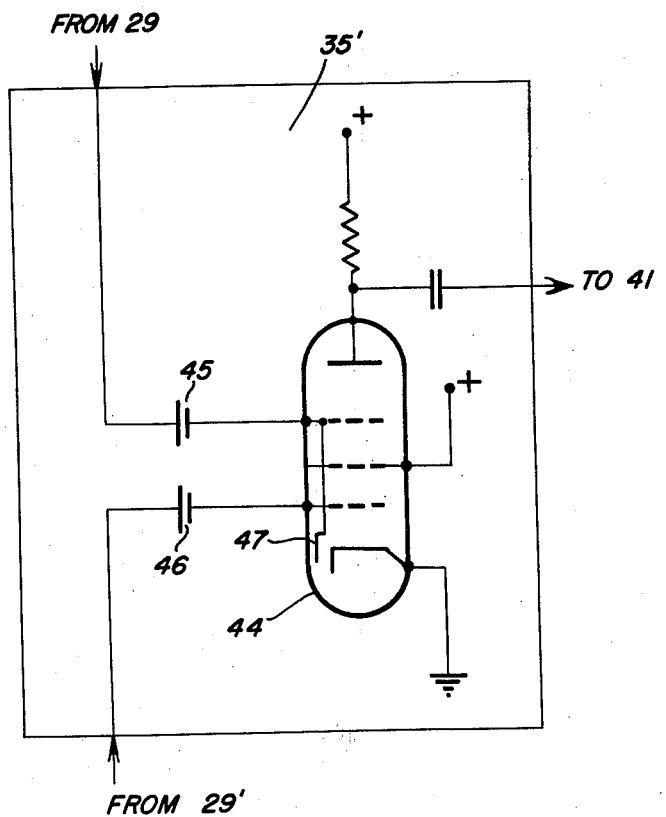

The invention is illustrated in the accompanying drawings in which FIG. 1 shows in simple block diagram form one embodiment suitable for the simultaneous elimination of the indications of echoes due to fixed targets and of echoes due to targets of a desired velocity with respect to the radar system so long as the fixed targets and the targets of said desired velocity are not in the same or closely adjacent positions, and FIG. 2 shows another form of direction circuit for use in the embodiment shown in FIG. 1. The illustrated embodiment is primarily intended to eliminate echoes due to moving rain belts or patches and is provided with means whereby adjustment for the speed of movement of the moving targets to be eliminated is provided. The said embodiment is presumed to be equipped with a so-called P.P.I. display and an azimuth searching aerial in accordance with customary practice and accordingly means are provided for taking into account the effect of azimuth rotation upon the operation of the system as respects moving target elimination.

Referring to FIG. 1 the radar system therein schematically represented comprises a transmitter 1, such for example as a klystron oscillator, which is pulsed at a predetermined pulse repetition frequency by a pulse modulator 2 as in the ordinary way. The resultant radio pulses are transmitted from and received upon an aerial 3 which is rotated in azimuth by a motor 4. The parts 1, 2, 3 and 4 are all as well known per se and are accordingly represented merely schematically by blocks. This type of showing for units which are in themselves in accordance with well known practice is adopted throughout the figure.

Received echo signals are fed from the aerial through a transmit-receive (T.R.) cell 5 to a mixer (such for example as a so called rat-race) 6 to which local oscillations from a local oscillator 7 are applied as second input. The same local oscillator also feeds output to a second rat-race mixer 8 which is fed from the transmitter. Intermediate frequency output from the mixer 6 is fed through a limiter 9 to a coherent detector 10 of any convenient known form and shows as including a diode 11. Intermediate frequency output from the mixer 8 is fed to a further mixer 12 which receives local oscillation from a variable frequency local oscillator 13, the frequency of which is controlled in well known manner by a reactance valve circuit represented by block 14. Output from the mixer 12 is passed through a suitable filter 15 to another mixer 16 whose local oscillator input is provided by a fixed frequency local oscillator 17. The frequency of the oscillator 17 is adjusted to be at substantially the middle of the range of variation of the oscillator 13. Output from the mixer 16 is passed through a further suitable filter 18 to provide the second input to the coherent detector 10 the two inputs to which are supplied to the anode and to the cathode respectively.

Detected output from the detector 10 is applied to a modulator 19 which receives high frequency input—for example at 10 mc./s.—from a local oscillator 20 and which accordingly provides output in the form of a modulated carrier. The said modulated carrier is fed to a pulse cancellation arrangement comprising two paths in parallel on their input sides and feeding on their output sides into an opposition combining circuit. One path comprises a delay device 21 giving a time delay equal to the interval between successive transmitted pulses followed by an amplifier 22 in turn followed by a detector 23. The other path comprises an attenuator 24, which may be adjustable, followed by a detector 25. The delay device or circuit 21 is constructed to give a delay substantially equal to the pulse repetition period and in order to ensure this equality any means known per se may be provided; for example the pulse modulator 2 may be automatically controlled by means including the delay device 21. As means for operating interlocking a pulse source and a delay circuit are well known per se and form no part of this invention it is considered unnecessary to show or describe them here. The outputs from the two detectors 23 and 25 are combined in opposition in a combining circuit 26 which may be of any known kind and the output from which is amplified in an amplifier 27, rectified by a rectifier 28 (preferably a full-wave rectifier) and passed to a cathode-follower 29 so as to provide a final low impedance output.

The reactance valve 14 receives its D.C. control voltage from a potentiometer 30 to which is fed voltage picked up by the rotating moving arm 31 of a so-called cosine potentiometer, the winding of which is schematically represented as on a former 32 which can be rotated by hand by a control knob 33. The showing of this rotation of the winding and former is of course purely diagrammatical. The rotary arm 31 is rotated by any convenient mechanical or electrical link in synchronism with the azimuth rotation of the aerial 3, the link being represented by the chain line 34.

The parts so far described as fed from the rat-race mixers 6 and 8 constitute one received signal channel and as will be appreciated pulse cancellation will be secured in this channel as respects echoes from targets having a velocity determined by the frequency difference between the oscillators 13 and 17, and therefore, since the frequency of oscillator 17 is fixed, by the oscillator 13. If, for example, the arrangement is to be set up to eliminate echoes due to moving belts or patches of rain, it will be necessary to take into account not only the direction and speed with which the rain belts or patches are moving, but also the varying direction in which the aerial is pointing as it rotates in azimuth. Varying aerial direction is taken care of by the cosine potentiometer 31, 32, since the arm 31 rotates in synchronism with the aerial.

Adjustment may be made to accommodate different wind directions by rotating the former 32 carrying the potentiometer winding and if the operator has information as to wind direction he can adjust the handle 33 to suit. Indeed it is possible to arrange for manual control by the handle 33 to be replaced by automatic control in dependence upon wind direction. Further manual adjustment (which again may be made automatic) to accommodate different wind speeds is provided by the potentiometer 30. Accordingly the apparatus so far described may be adjusted to eliminate echoes due to targets of predetermined velocity determined by the difference between the frequencies of the oscillators 13 and 17 and will do so despite the fact that the aerial 3 is rotating in azimuth.

The second channel of the receiver will be described in less detail. This channel is designed to eliminate echoes from fixed targets and consists of parts like those in the first channel except that no means are provided for injecting a velocity determining frequency into it, since, fixed targets being required to be eliminated, the frequency which would have to be injected would be zero. In order to shorten the description, parts in the second channel corresponding to parts in the first are indicated by the same reference numeral with a tick suffix (i.e. "prime"). It will be seen that in the particular arrangement illustrated the carrier local oscillator 20 is common to both modualtors 19 and 19', one in each channel.

The outputs from the two cathode-followers 29 and 29', one at the output end of each channel, are applied to a detector adapted to provide zero output if any one of the inputs fed thereto is zero. An example of such a detector is the well kown product detector as shown in FIG. 2.

The detector shown in FIG. 1, however, is a so called coincidence detector and amplifier 35. This type of detector has the advantage of being very simple. Each of the inputs to this detector is fed through its own rectifier 36 or 37 to a resistance 38 the "live" end of which is connected to the grid of a valve 39, shown as a pentode, and the other end of which is connected to a source (not shown) of suitable voltage applied at terminal 40. Thus, for example, if the peak signal values expected to be applied to the rectifiers 36, 37 are about 1½ volts (a practical figure) the voltage applied at 40 might conveniently be 2 volts. The output from the anode of the valve 39 is fed to any convenient well known utilisation and display means represented by the block 41 which is presumed to include such further amplifiers as may be necessary, a P.P.I. display tube, the customary radial time base deflecting means for the tube, and the customary azimuth rotation deflection means for the tube. The time base means is of course interlocked with the pulse modulator as is indicated by the lead 42 between the said modulator 2 and the block 41 and the azimuth or rotation means is inter-linked with the azimuth rotation of the aerial as is indicated by the chain line 43.

The circuit shown in FIGURE 2 is a product detector which can be used in place of the coincidence detector 35 of FIGURE 1. The detector 35' comprises a pentode or a diode pentode 44; signals from 29 and 29' are applied respectively to two of its grids which are biased by sources of negative bias 45, 46 in order to bring each grid, in the absence of positive going signals, to the potential at which substantially no anode current will flow, even when the other grid has positive going signals applied to it. The output of the coincidence detector is not strictly proportional to the product of the positive going echo signals applied to it, although it has a similar effect to a product detector. The amplitude of the output is substantially equal to the less positive of the two input signals. Because of this feature of the coincidence detector that provides zero output when either input is zero, is it possible to eliminate from the display echoes at specified velocities such as ground echoes and rain, and yet at the same time to leave target echoes of other velocities for effecting a display. The output is taken off at the anode and fed to 41. A diode 47 is sometimes fitted within the valve envelope between the last grip and the cathode to prevent accidental excursion into secondary emission conditions.

Although the illustrated embodiment is capable of simultaneously eliminating echoes from fixed targets and echoes from differently positioned targets of one given velocity, echoes from targets of another velocity and again differently positioned may be simultaneously eliminated by adding a third channel like the channel which commences at the limiter 9 and which has its own arrangement of parts corresponding to the parts 12, 13, 14, 16, 17 and 18 for the injection of a frequency component corresponding to the additional target velocity to be dealt with. If there is a third channel provided in this way the output from the cathode-follower at the end of that channel will be connected through a further rectifier (corresponding to the rectifiers 36 and 37) to constitute a third input to the coincidence detector. Indeed any number of channels may be provided.

In the arrangement illustrated it is assumed that the signals fed into the coincidence detector are positive going. This is obviously not an essential feature and negative going signals could be employed by reversing the connections of the appropriate diodes and applying negative D.C. voltage at terminal 40. In all cases the diodes, some of which are represented as thermionic and others as of the crystal type, could be of either type.

Referring again to the drawing it will be appreciated that if the fixed targets, cancelled on one channel, and the moving targets cancelled in the other, are in the same position with respect to the radar system, they will not be eliminated because echoes from all targets appear in both channels simultaneously and accordingly neither channel input to the detector will be zero. Subject to this limitation, however, the invention will eliminate different velocity targets from the display.

I claim:

1. A radar system having a receiver portion including at least two signal channels with their inputs in parallel, means in one of said channels for substantially cancelling signals due to targets having one pre-determined velocity with reference to the system, means in another of said channels for substantially cancelling signals due to targets having another pre-determined velocity with reference to said system, detector means fed with the outputs from said channels, said detector means being adapted to provide zero output when any of the inputs thereto is zero, and means for utilising the output from said detector means.

2. A system as claimed in claim 1 wherein said detector means is a coincidence detector.

3. A system as claimed in claim 1 wherein said detector means is a product detector.

4. A system as claimed in claim 1 wherein one of the channels is provided with means for substantially cancelling signals due to targets having zero velocity with reference to the system and at least one other channel is provided with means for cancelling signals and, preceding said means in said other channel, means for mixing with the signals fed to said channel a pre-determined frequency component the value of which is chosen in dependence upon the target velocity with respect to which the signal cancelling means is to be operative.

5. A system as claimed in claim 1 wherein, in each channel, detected signals are applied to modulate a carrier and the resultant modulated carrier fed into two paths one of which contains a detector preceded by a delay device providing a delay time equal to the interval of time between successive transmitted pulses, and the other of which contains a detector without a preceding delay device, the outputs from the two paths being combined in opposition to provide one input to the detector means fed from the channels.

6. A system as claimed in claim 1 and including an aerial which is varied in azimuth, means for applying two sets of signals to each of said channels, said two sets of signals being received and transmitted signals, and means, in at least one of said channels, for changing the frequency of one of said sets of signals, said frequency changing means including a local oscillator whose frequency is automatically varied with the variations in azimuth of said aerial.

7. A system as claimed in claim 6 and comprising means for adjusting the time relationship between the variation of the frequency of said local oscillator and the variation in azimuth of said aerial.

References Cited in the file of this patent

UNITED STATES PATENTS 2,678,440     Watt _____ May 11, 1954